Aug. 29, 1933.   R. M. GILSON   1,924,603
REMOTE INDICATION APPARATUS
Filed Aug. 14, 1931
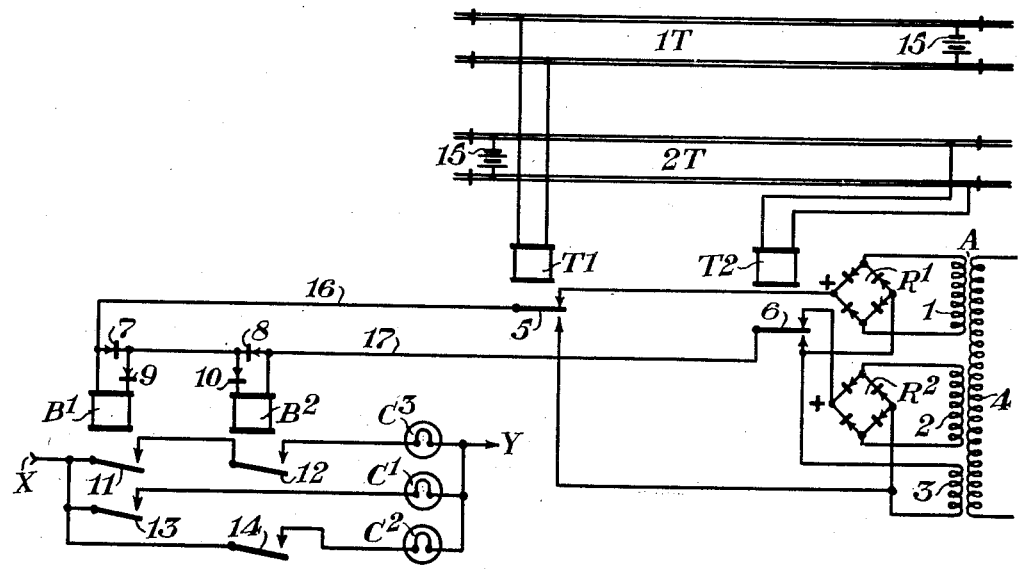
INVENTOR:
R. M. Gilson,
By
His ATTORNEY.

Patented Aug. 29, 1933

1,924,603

UNITED STATES PATENT OFFICE 1,924,603

REMOTE INDICATION APPARATUS

Robert M. Gilson, Pittsburgh, Pa., assignor to The Union Switch & Signal Company, Swissvale, Pa., a corporation of Pennsylvania Application August 14, 1931. Serial No. 556,972

6 Claims. (Cl. 175—320)

My invention relates to remote indication apparatus of the type wherein a pair of line wires are supplied with direct current of normal and reverse polarity from a source of alternating current through rectifiers. One feature of my invention is the provision of apparatus of this character so arranged that a false indication cannot be given by what is known as the back current through a rectifier, that is, the current which flows through the rectifier in its high resistance direction.

I will describe one form of apparatus embodying by invention, and will then point out the novel features thereof in claims.

The accompanying drawing is a diagrammatic view showing one form of apparatus embodying my invention.

Referring to the drawing, the reference characters 1T and 2T designate two sections of railway track, each of which is provided with a track circuit comprising a battery 15 and a track relay T1 or T2. The relays T1 and T2 may, however, be operated or controlled in any desired manner, the track circuit control being illustrated merely as an example.

The reference character A designates a transformer having a primary 4 and three secondary windings 1, 2 and 3. The primary 4 is constantly supplied with alternating current from a source which is not shown in the drawing. Secondary winding 1 is connected with the input terminals of a full-wave rectifier $R^1$, while secondary winding 2 is connected with the input terminals of a similar full-wave rectifier $R^2$. The left-hand output terminal of each rectifier is the plus or positive terminal, and the right-hand output terminal is the minus or negative terminal.

Two line wires 16 and 17 connect the apparatus thus far referred to with two indication relays $B^1$ and $B^2$. These relays are connected in series across the conductors 16 and 17. A rectifier 7 is connected in multiple with relay $B^1$, while a rectifier 8 is connected in multiple with relay $B^2$. These rectifiers are oppositely poled, so that when current of normal polarity is supplied to the conductors 16 and 17, that is, when conductor 17 is positive, relay $B^1$ will be effectively energized, whereas current will be conducted around relay $B^2$ by rectifier 8. When current of reverse polarity is supplied to the conductors 16 and 17, however, so that conductor 16 is positive, the current will be conducted around relay $B^1$ by rectifier 7, whereas relay $B^2$ will be effectively energized. A second rectifier 9 is connected in series with relay $B^1$, and is poled to conduct the current which energizes this relay, while a second rectifier 10 is connected in series with relay $B^2$ and poled to conduct the current which energizes that relay.

When track relay T1 is energized, conductor 16 is connected with the positive terminal of rectifier $R^1$ through the front point of contact 5. When track relay T2 is energized, conductor 17 is connected with the positive terminal of rectifier $R^2$ through the front point of contact 6. With both track relays energized, neither conductor is connected with the negative terminal of either rectifier.

I will now assume that track section 1T becomes occupied, thereby deenergizing relay T1. Conductor 16 will then be connected with the negative terminal of rectifier $R^2$ through the back point of contact 5, and since conductor 17 is already connected with the positive terminal of this rectifier, current of normal polarity will be supplied to the conductors 16 and 17, so that relay $B^1$ will become energized.

If track section 2T instead of 1T becomes occupied, track relay T2 will become deenergized, whereupon conductor 17 will be connected with the negative terminal of rectifier $R^1$ through the back point of contact 6. Conductor 16 is already connected with the positive terminal of this rectifier, and so it follows that current of reverse polarity will be supplied to conductors 16 and 17, so that relay $B^2$ will become energized.

If now both track sections 1T and 2T become occupied, both track relays will become deenergized. Conductor 16 will then be connected with one terminal of secondary winding 3 through the back point of contact 5, whereas conductor 17 will be connected with the other terminal of secondary winding 3 through the back point of contact 6, with the result that alternating current will be supplied to relays $B^1$ and $B^2$. These relays will then both become energized.

Relays $B^1$ and $B^2$ may be employed to operate indicating apparatus of any desired character. As here shown, this indicating apparatus comprises three electric lamps $C^1$, $C^2$ and $C^3$, which are controlled by contacts 11, 12, 13 and 14 of relays $B^1$ and $B^2$. The circuits for these lamps will be obvious from the drawing without explanation, it only being necessary to point out that when relay $B^1$ is energized, lamp $C^1$ will be lighted; when relay $B^2$ is energized lamp $C^2$ will be lighted; and when both relays are energized all three lamps will be lighted. The circuit for each lamp includes a source of current, the terminals of which are designated X and Y.

Reverting now to the rectifiers R¹ and R², it will be observed that when either rectifier is supplying current to the conductors 16 and 17, the other rectifier is entirely disconnected from these conductors, so that current flowing through such other rectifier in the high resistance direction cannot cause a false operation of one of the relays B¹ or B².

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a transformer having two secondary windings, two full-wave rectifiers one for each said winding and each having its input terminals connected with the associated winding, a pair of conductors, means for supplying current of one polarity or the other to said conductors from one of said rectifiers or the other and for entirely disconnecting from said conductors the rectifier which is not supplying current thereto, and polarity responsive receiving means connected with said conductors.

2. In combination, two full-wave rectifiers each supplied with alternating current, a pair of conductors, means for supplying current of one polarity or the other to said conductors from one of said rectifiers or the other and for entirely disconnecting from said conductors the rectifier which is not supplying current thereto, and polarity responsive receiving means connected with said conductors.

3. In combination, a transformer having two secondary windings, two full-wave rectifiers one for each said winding and each having its input terminals connected with the associated winding, a pair of conductors, means for supplying current of one polarity or the other to said conductors from one of said rectifiers or the other and for entirely disconnecting from said conductors the rectifier which is not supplying current thereto, two relays connected in series across said conductors, and oppositely poled rectifiers connected in multiple with said relays whereby one relay or the other will respond according as current of one polarity or the other is supplied to said conductors.

4. In combination, two full-wave rectifiers each supplied with alternating current, a pair of conductors, two control relays, means for connecting one conductor with one terminal of one rectifier or the unlike terminal of the other rectifier according as one relay is energized or deenergized, means for connecting the other conductor with the remaining terminal of the second rectifier or the remaining terminal of the first rectifier according as the other relay is energized or deenergized, and polarity responsive receiving means connected with said conductors.

5. In combination, two full-wave rectifiers each supplied with alternating current, a pair of conductors, two control relays, means for connecting one conductor with one terminal of one rectifier or the unlike terminal of the other rectifier according as one relay is energized or deenergized, means for connecting the other conductor with the remaining terminal of the second rectifier or the remaining terminal of the first rectifier according as the other relay is energized or deenergized, two controlled relays connected in series across said conductors, and oppositely poled rectifiers connected in multiple with said controlled relays whereby one relay or the other will respond according as current of one polarity or the other is supplied to said conductors.

6. In combination, a transformer having three secondary windings, two full-wave rectifiers one for each of the first and second of said windings and each having its input terminals connected with the associated winding, a pair of conductors, two control relays, means for connecting one conductor with one output terminal of one rectifier or with the unlike output terminal of the other rectifier and with one terminal of said third winding according as one relay is energized or deenergized, means for connecting the other conductor with the remaining terminal of the second rectifier or with the remaining terminal of the first rectifier and the remaining terminal of the third winding according as the other relay is energized or deenergized, two controlled relays connected in series across said conductors, and oppositely poled rectifiers connected in multiple with said controlled relays, whereby one relay or the other will respond according as one control relay or the other is deenergized and both controlled relays will respond when both control relays are deenergized.

ROBERT M. GILSON.